US 6,956,854 B2
Oct. 18, 2005

United States Patent
Ganesh et al.

(54) NETWORK SWITCHING DEVICE WITH FORWARDING DATABASE TABLES POPULATED BASED ON USE

(75) Inventors: Jayasenan Sundara Ganesh, Veradale, WA (US); Timothy Scott Michels, Spokane, WA (US); Parmajeet Singh, Veradale, WA (US); Greg W. Davis, Spokane, WA (US)

(73) Assignee: Alcatel Internetworking (PE), Inc., Spokane, WA (US)

( * ) Notice: Subject to any disclaimer, the term of this patent is extended or adjusted under 35 U.S.C. 154(b) by 420 days.

(21) Appl. No.: 10/027,723

(22) Filed: Dec. 20, 2001

(65) Prior Publication Data

US 2002/0051450 A1 May 2, 2002

Related U.S. Application Data

(63) Continuation of application No. 09/166,604, filed on Oct. 5, 1998.

(51) Int. Cl.$^7$ .................. H04L 12/56; G06F 15/173
(52) U.S. Cl. .................. 370/392; 370/389; 709/238; 711/218
(58) Field of Search ................. 370/357, 362, 370/383, 389, 392, 352, 355, 356, 360, 367, 386, 398, 399, 400, 428, 429; 709/220, 242, 256, 250, 230, 238, 245; 711/200, 202, 218, 206, 211, 216; 712/29, 34

(56) References Cited

U.S. PATENT DOCUMENTS

| 5,386,413 A | | 1/1995 | McAuley et al. ........... 370/392 |
|---|---|---|---|
| 5,412,648 A | * | 5/1995 | Fan ............................ 370/414 |
| 5,740,175 A | | 4/1998 | Wakeman et al. |
| 5,796,944 A | * | 8/1998 | Hill et al. ................... 709/250 |
| 5,909,686 A | | 6/1999 | Muller et al. ............... 370/400 |
| 5,940,596 A | * | 8/1999 | Rajan et al. ................ 709/242 |
| 6,161,144 A | * | 12/2000 | Michels et al. ............. 709/238 |

FOREIGN PATENT DOCUMENTS

| FR | 2 753 323 | 3/1998 |
|---|---|---|
| WO | WO 95/03659 | 2/1995 |

* cited by examiner

*Primary Examiner*—Afsar Qureshi
(74) *Attorney, Agent, or Firm*—Craig A. Boersten; V. Lawrence Sewell

(57) ABSTRACT

A switching device for forwarding network traffic to a desired destination on a network, such as a telephone or computer network. The switching device includes multiple ports and uses a lookup table containing lookup keys to determine which port to forward network traffic over. The lookup tables are populated based on use. Consequently, the lookup tables on different ports contain different addresses. By storing only addresses that a port uses, each port's lookup table is unique to that port's characteristics. Additionally, aging techniques are used on both source and destination addresses in the lookup table so that stale entries are removed and memory is conserved.

13 Claims, 6 Drawing Sheets

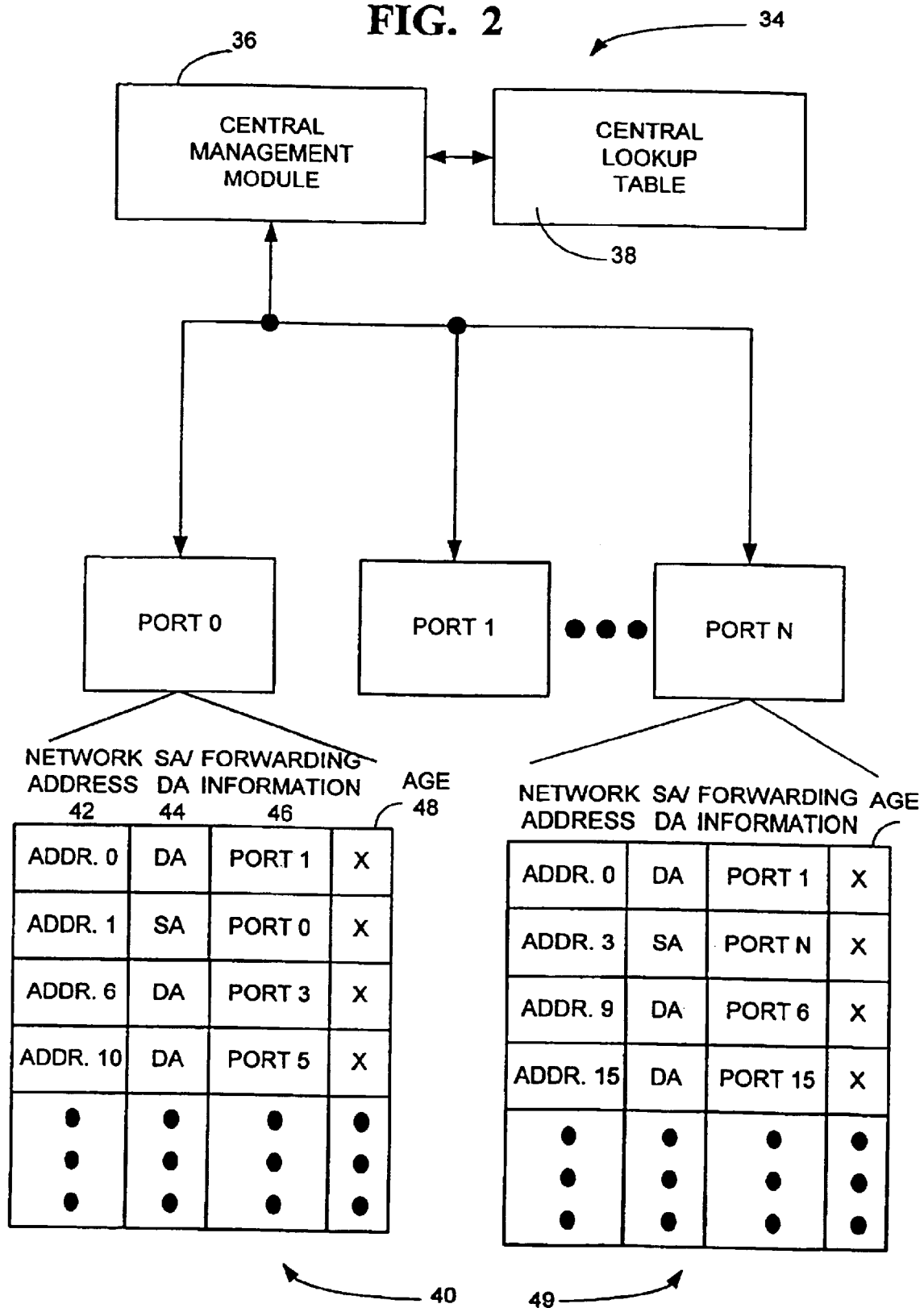

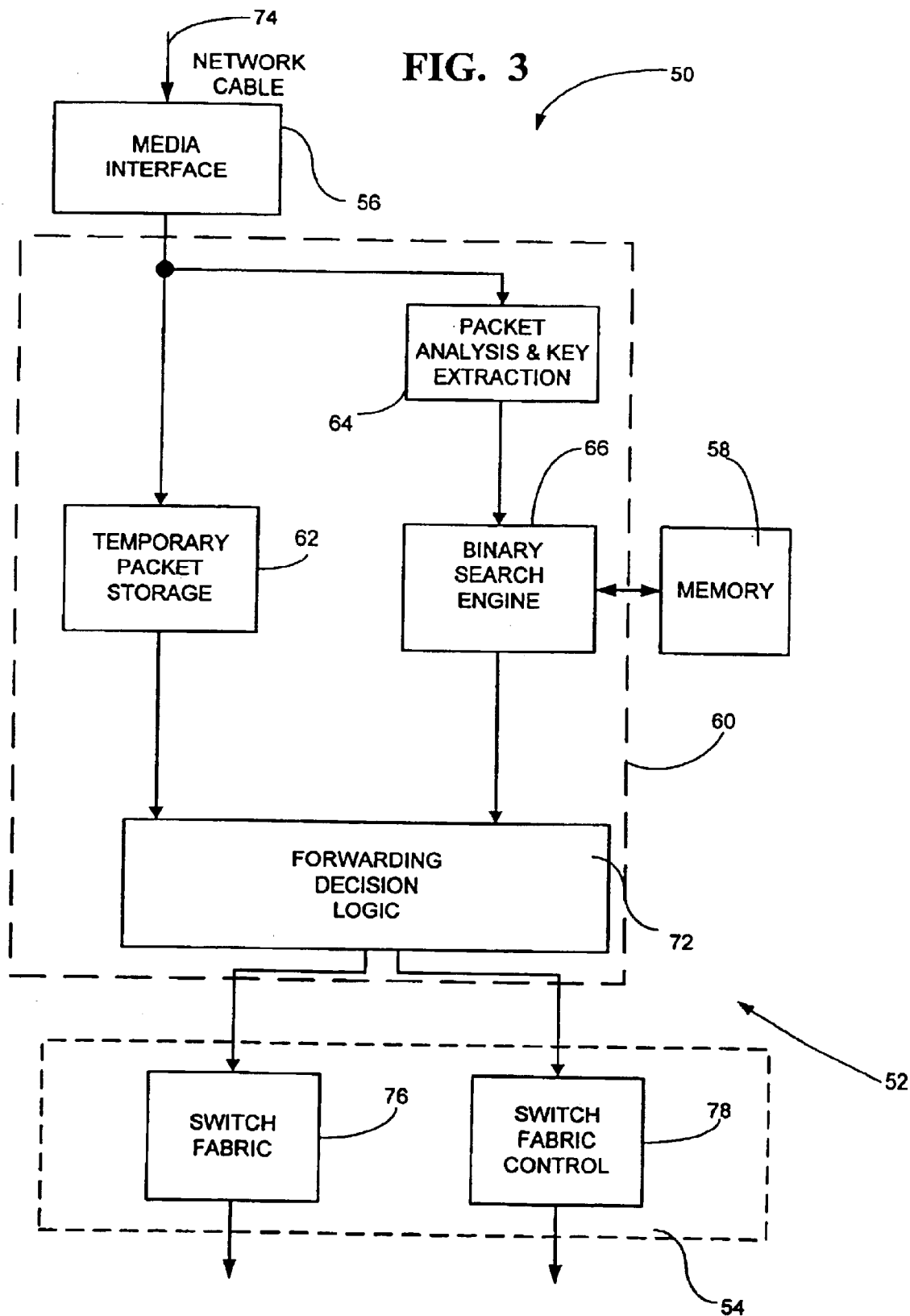

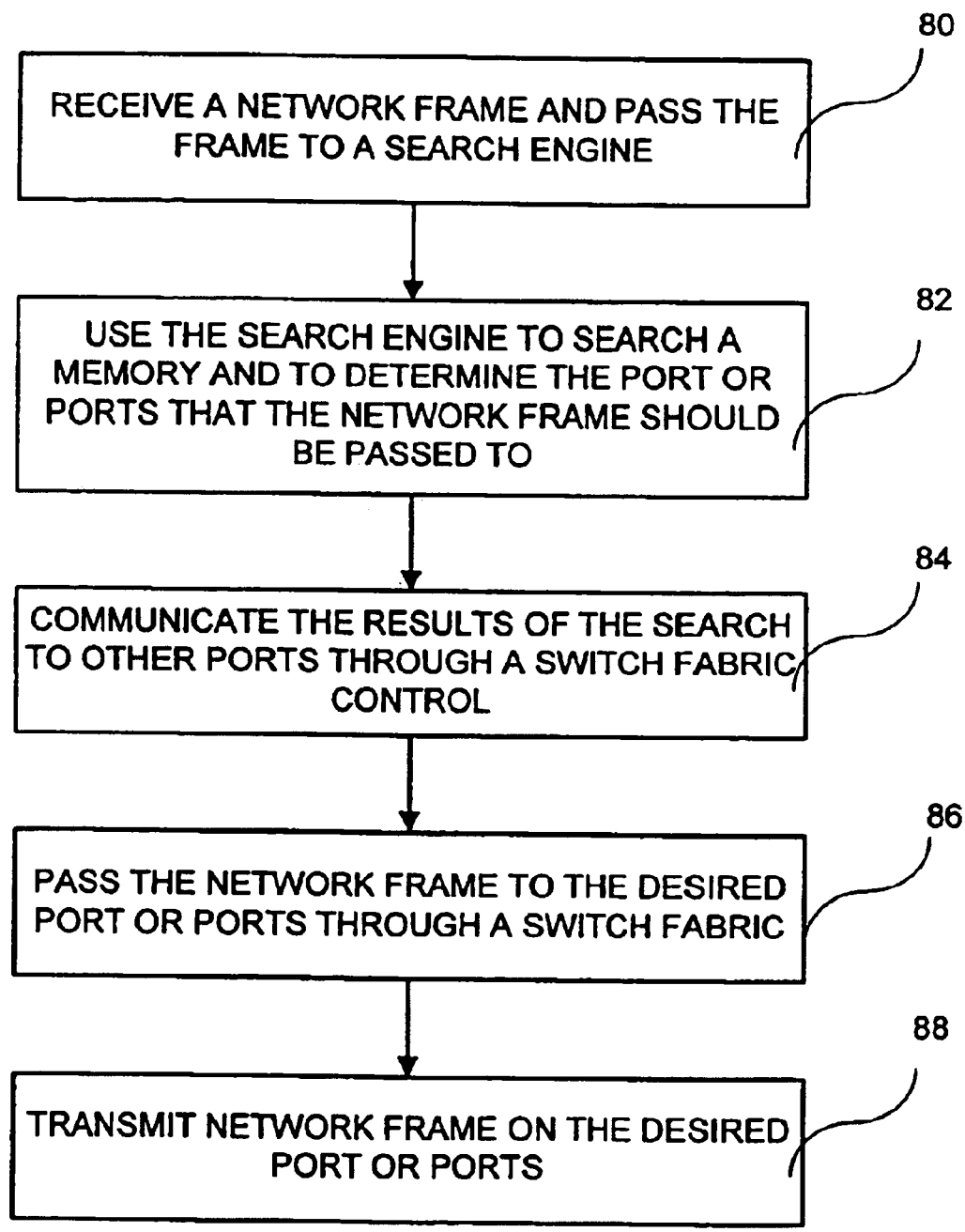

NETWORK SWITCHING DEVICE WITH FORWARDING DATABASE TABLES POPULATED BASED ON USE

CROSS-REFERENCE OF APPLICATIONS

This application is a continuation of U.S. patent Ser. No. 09/166,604, filed Oct. 5, 1998, the content of which is hereby incorporated by reference.

FIELD OF THE INVENTION

This invention relates generally to networks, such as telephone and computer networks, and, more particularly, relates to routing information through such networks.

BACKGROUND OF THE INVENTION

A network allows two or more parties to communicate with each other. In their simplest form, networks generally include transmission lines and switching devices (e.g., routers, switching routers, switches, etc.). The transmission lines carry signals (e.g., electrical, optical, etc.), while the switching devices are intermediate stations that establish temporary connections between transmission lines. In telephone networks, for example, a caller's line goes to a switching device where the actual connection is made to the called party. In computer networks, devices such as routers receive messages on the network and forward the messages to their correct destinations. Computer networks can be as small as a local area network (LAN) consisting of a few computers, printers, and other devices, or it can consist of many computers distributed over a vast geographical area (e.g., the Internet).

An example computer network 10 is shown in FIG. 1A. The network includes two local segments 12 and 14, and connection to a remote network 16. Nodes, labeled as A–J, represent computers connected to the local segments. A switching device 20 includes three ports 22–24 and switches network traffic between segments 12, 14, and the remote network 16. Network 16 may also include switching devices, such as switching device 21, which then connects other segments (not shown) to the network. Switching device 20 allows the nodes on one segment to communicate with nodes on other segments and to other switching devices. The nodes communicate with each other through a protocol (e.g., HTTP, TCP/IP, SMB, etc.) which allows the nodes to transmit and receive network frames (a network frame includes a destination address, a source address, and a data field). When switching device 20 receives a frame from a node, it analyzes the destination address by searching a lookup table 26, shown in FIG. 1B. Lookup table 26 includes table entries having a network address field and a port field. When the destination address is matched to a network address in the lookup table, switching device 20 determines which port to forward the frame to by obtaining the port number corresponding to the matched network address. For example, if node A on segment 12 sends a message to node H on segment 14, switching device 20 receives the message from node A and in response searches the entries in the network address field of lookup table 26. Table entry 28 contains the network address for H. A corresponding port field 30 for network address H indicates that the frame should be forwarded over port 2. Additional background information on switches can be found in a number of references, such as *Fast Ethernet* (1997) by L. Quinn et al., *Computer Networks* (3$^{rd}$ Ed. 1996 by A. Tannenbaum, and *High-Speed Networking with LAN Switches* (1997) by G. Held, all of which are incorporated herein by reference.

The switching device can obtain the network addresses for the lookup table in different ways, depending on the particular implementation of the switching device. For example, the switching device may snoop network traffic so that when a frame is received on a port, the switching device determines if the frame's source address is in the table and, if it is not, adds an entry containing the source address and the inbound port to the table. Thus, the switching device is said to "learn" addresses and port numbers from any frame that is transmitted by a node. Another technique some switching devices, such as routers, use to obtain the lookup table is from other switching devices through a special protocol. Thus, routers supply network addresses to each other to supplement their lookup tables.

In some switches, the lookup table is kept centrally and is controlled by a central management module. When a port receives a network frame, it passes a request to the central management module, which searches the lookup table and passes forwarding information back to the port. The port can then properly forward the network frame. To increase speed, other switches have a centrally located lookup table and copies of the lookup table stored in memory locally on each port. Having multiple copies of the lookup table is faster since the ports obtain forwarding information directly from their local memory, rather than communicating with the central management processor.

Unfortunately, having multiple copies of the lookup table also requires a lot of memory. Additionally, the central management processor indiscriminately copies the entire central lookup table to all of the local lookup tables, even though many ports do not use all of the lookup table entries. Thus, a port may store lookup table entries that it never uses, simply because another port is using those entries. Having unused lookup table entries wastes valuable memory space and slows the speed of the switch since searching more entries requires extra time.

An objective of the present invention, therefore, is to provide a high-speed network switching device that efficiently stores the address lookup tables and that overcomes problems of the prior art.

SUMMARY OF INVENTION

The present invention provides a switching device (e.g., router, switch, switching router, etc.) that forwards network traffic to a desired destination on a network, such as a telephone or computer network. The switching device includes multiple ports and uses lookup tables to determine which port to forward network traffic over. The network traffic is typically in the form of network frames that include source and destination addresses.

In one aspect of the invention, a central management module includes a central lookup table that includes network addresses and port numbers associated with the network addresses. However, this central lookup table is not indiscriminately copied to each local lookup table. Instead, a local lookup table stores only pertinent addresses needed for that local lookup table. More specifically, a port associated with a local lookup table only needs to know of source addresses learned by that port and destination addresses that the port recently forwarded a frame to. Thus, local lookup tables throughout the switch differ in terms of the network addresses they store.

In another aspect of the invention, the lookup table entries distinguish source addresses from destination addresses and the destination addresses are "learned". Source address learning is known in the prior art. However, in the present invention, destination addresses are also learned by the ports so that the ports may locally store destination addresses frequently used. However, other ports that do not use such destination addresses do not store the destination address in their local memory. By learning destination addresses that are frequently used and storing such addresses locally, the ports can more efficiently use the local lookup table storage and increase the speed of the switch.

In yet another aspect of the invention, both source and destination addresses are removed from the lookup tables if not used for a predetermined period of time. Such removal of addresses is called "aging" and source address aging has been performed in previously known switches. However, destination address "aging" has not heretofore been used. With source address aging, the address is removed if no ports in the system received the source address for a predetermined period of time. Destination address aging differs because destination addresses are a characteristic of the particular port. For example, first and second ports may have the same destination address in their lookup tables. If the first port has not sent a network frame to that destination address for a particular period of time, it is deleted from the local lookup table for that port. However, the second port may frequently be sending frames to the destination address, so the second port maintains the destination address in its local lookup table. Notably, the first and second ports now have different lookup table entries and the lookup tables are populated based on the particular need for that port.

These advantages and other advantages and features of the inventions will become apparent from the following detailed description, which proceeds with reference to the following drawings.

BRIEF DESCRIPTION OF DRAWINGS

FIG. 2 shows a switching device according to the invention including multiple ports and showing lookup tables within selected ports that store source (SA) and destination (DA) addresses.

FIG. 3 shows further details of a port within switching device of FIG. 2.

FIG. 4 is a flowchart of a method for forwarding network frames in the port of FIG. 3.

DETAILED DESCRIPTION OF AN ILLUSTRATIVE EMBODIMENT

Figures 1A, 1B:
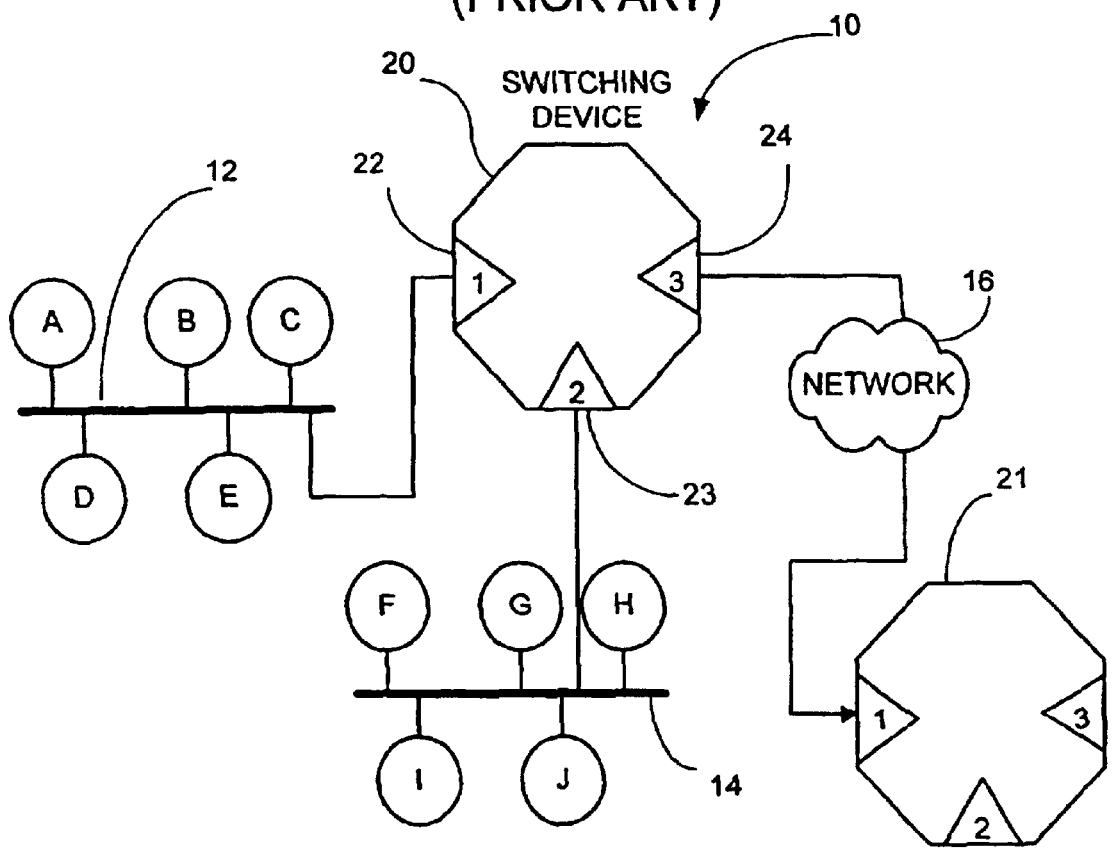
FIG. 1A shows a known network containing multiple segments connected through a switching device.
FIG. 1B shows a known lookup table stored in the switching device for identifying nodes connected to the segments.

FIG. 2 shows a switching device 34 that includes a central management module 36 coupled to a central lookup table 38. Central management module 36 is coupled to multiple ports within the switch. The ports are shown generically as port 0, 1, . . . N, where N represents the highest number port in the system and can be virtually any positive integer based on the size of the switch. The ports may each have their own lookup table or share the lookup table with other ports. Although the invention may be implemented with two or more ports sharing a lookup table, hereinafter each port is described as having its own lookup table. An example lookup table according to the invention is shown at 40 at represents the lookup table for port 0. The lookup table 40 includes a network address field 42, an SA/DA field 44, a forwarding information field 46, and an age field 48. The network address field 42 contains network addresses of devices on the network. The addresses are shown generically, but can be a wide variety of addresses, such as MAC, IP, IPv6, IPX, IPv4, etc. The SA/DA field 44 denotes whether the address is a source address (SA) or a destination address (DA). A source address indicates that the entry was learned by the port associated with that lookup table, while a destination address indicates that another port learned the address. The forwarding information 46 field stores forwarding information, such as a port number associated with the network address. The forwarding information field typically includes other information (e.g., a MAC address) in addition to the port number, but for simplicity only a port number is shown. The age field 48 contains information relating to how recently the associated network address has been used. The age field may be, for example, a variable (shown generically as "X") that is incremented (or decremented) when a fixed period of time is exceeded. If the variable reaches a timeout value, then the lookup table entry is stale since it has not been used recently and the entry is deleted. When a lookup table entry is used, the age field is reset since the entry is "fresh."

A similar lookup table 49 is shown for port N. Some of the addresses in lookup table 40 match those of table 49, such as Addr. 0. On the other hand, some of the addresses differ. For example, lookup table 40 includes Addr. 1, Addr. 6 and Addr. 10, which lookup table 49 does not include. Lookup table 49 also has addresses that lookup table 40 does not include, such as Addr. 9 and Addr. 15. The different entries in the lookup tables 40, 49 show one advantage of the present invention. That is, the lookup tables for each port are populated based on actual use by the port associated with that lookup table. For example, lookup table 49 stores Addr. 9 because it recently forwarded a network frame containing Addr. 9 to port 6. On the contrary, lookup table 49 does not store Addr. 6 because it has not recently received a frame containing this address. The central lookup table 34 is a master table and includes all addresses from the various lookup tables.

FIG. 3 shows a detailed circuit diagram for a port. The invention is not limited to any particular design of the port, but the explanation is provided for completeness. FIG. 3 shows a switching device 50 having a port 52 and port intercommunication logic 54. Port 52 includes a media interface 56, a memory 58, and a search engine 60. The search engine 60 includes temporary packet storage 62, packet analysis and key extraction logic 64, an internal binary search engine 66, and forwarding decision logic 72. There are multiple ports (not shown) in switching device 50. One or more ports are located on channel or line cards (not shown) mounted in a chassis. The number of ports and how the ports and port intercommunication logic 54 are mounted within a chassis are based on the particular application and are not important to the invention.

Media interface 56 connects switching device 50 to a network (not shown) through a network cable 74. The network cable can take a variety of forms (e.g., fiber optic, twisted-pair, coaxial, etc.) depending on the type of network. A variety of network standards and protocols may be used, such as TCP/IP, IPX/SPX, FDDI, ATM, ETHERNET, GIGABIT ETHERNET, FAST ETHERNET, Token Ring, SONET, etc. Other network protocols, standards, and network cables now existing or later developed may be used with the invention, since these particular aspects are not important to the invention. Media interface 56 is a communication link between search engine 60 and the network. Thus, media interface 56 allows search engine 60 to send network frames in any desired format and media interface 56 reformats the frames for the particular network. Similarly, media interface 56 receives network frames from the network and formats the frames so they may be read by search engine 60. The media interface used is based on the particular application and is not important to understanding the invention.

Temporary packet storage 62 within search engine 60 holds the network frame temporarily while other components within the search engine determine where to forward the network frame to, as is further described below. In some circumstances, a decision may be made to not forward the packet at all. In such cases, the network frame is never passed to the port intercommunication logic. Depending on the size of the network frame, the temporary packet storage 62 may hold several network frames, or, alternatively, only a portion of a network frame as it is forwarded to another port.

Packet analysis and key extraction logic 64 extracts information, such as the source and destination addresses from the network frame, and creates a key which is passed to the binary search engine 66. The packet analysis and key extraction logic 64 may also pass additional information to the search engine 66, such as virtual LAN information that comes with the network frame or is derived based on the type of network frame.

Search engine 66 is coupled to memory 58. The memory stores a lookup table that the binary search engine uses for analyzing network frames received from media interface 56. A management processor (not shown) is coupled to search engine 66 and maintains the lookup table in memory 58. Specifically, the management processor may direct the search engine to delete old table entries, insert new table entries and generally maintain the table in sorted order so that the search engine performs searches efficiently and correctly.

When search engine 60 determines that a frame is to be forwarded to other ports in switching device 50, it passes the network frame to the port intercommunication logic 54. Port intercommunication logic 54 includes a switch fabric 76 and a switch fabric control 78. Switch fabric 76 can take a variety of forms. For example, the switch fabric can be a cross-bar switch, which is commonly used in telecommunications switching. The cross-bar switch creates a path between a receiving port and a transmitting port so that the network frame may be passed therebetween. A wide variety of cross-bar switches may be used, such as cut-through switches, interim cut-through switches, and store-and-forward switches. Other types of switch fabrics may also be used. For example, switch fabric 76 may also be a central memory using a bus arbitration device and a central bus. Using a shared-memory bus architecture, all ports access a memory pool located locally on a switching module or work group switch. The ports can access the central memory through a common bus when arbitration device grants it access. Another possible switch fabric that can be used is a parallel access shared-memory architecture. In a parallel access shared memory, all ports share the central memory. However, a bus arbitration scheme is not used. Instead, every port has a dedicated path into and out of the central memory fabric. Therefore, all ports can simultaneously access the centralized memory pool at any time. A wide variety of existing switch fabrics or later developed switch fabrics may also be used. The particular switch fabric and switch fabric control is not of importance to the invention.

Switch fabric control 78 controls network frames as they are passed through the switch fabric. In the case where the switch fabric is a cross-bar switch, the switch fabric control is typically called a scheduler. The scheduler establishes a connection within the cross-bar switch so that a search engine on one port can directly pass a network frame to a search engine on another port. In the case where the switch fabric is a memory, the switch fabric control tells a receive-side search engine where to store the frame in memory. After the frame is stored in memory, the switch fabric control signals a transmitting-side port that the network frame is ready to be transmitted and provides the address of the memory location where the frame in located. The switch fabric control may also provide priority information to the transmitting-side port.

FIG. 4 shows a flow chart of a method used by the switching device 50 for forwarding network frames. In step 80, the media interface 56 receives a network frame from the network and passes the frame to search engine 60. The network frame contains a destination address that indicates the ultimate destination for the network frame. In step 82, search engine 60 searches memory 58 to determine whether the destination address from the network frame is located within the lookup table of memory 58. If a network address matches the destination address, forwarding information indicating where the frame should be forward to is also obtained from the lookup table. Assuming that the forwarding information was properly found in the lookup table and the appropriate port was determined, the search engine passes the search results to switch fabric control 78 (step 84). In step 86, search engine 60 transfers the network frame through switch fabric 76. If the switch fabric is a cross-bar switch, the switch fabric control 78 establishes the connection in the switch fabric and communicates to search engine 60 when to send the network frame. If the switch fabric is a central memory with or without bus arbitration, the switch fabric control tells search engine 60 where in the switch fabric to store the network frame. Search engine 60 then stores the network frame at the indicated location. The switch fabric control also informs the other ports of where the network frame is stored so that they may properly access it within the switch fabric. Regardless of the technique used with the switch fabric, the network frame is obtained from the switch fabric and transmitted on one or more ports (step 88).

Figure 5:
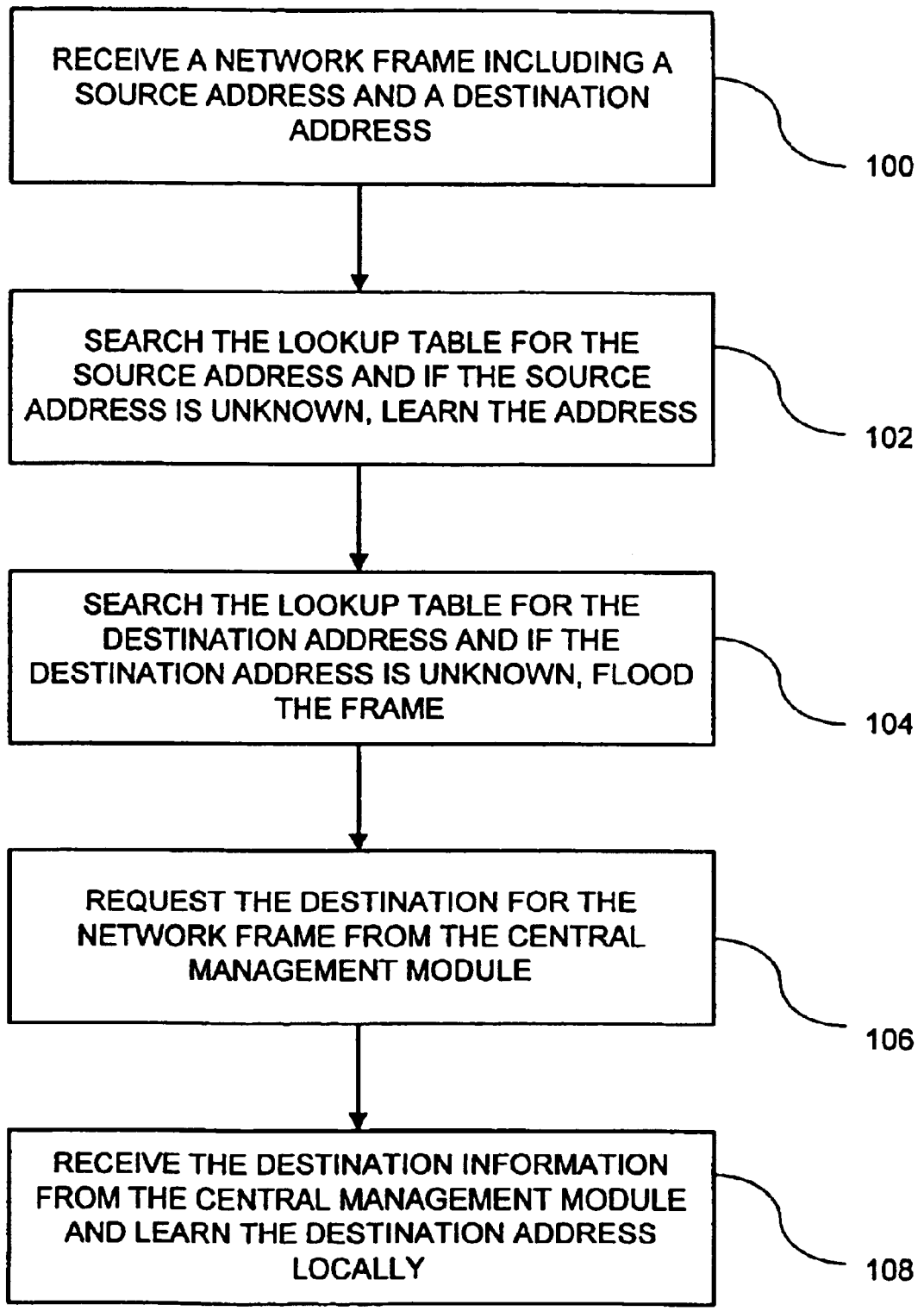
FIG. 5 is a flowchart of a method for learning source and destination addresses within a lookup table.

FIG. 5 shows a flowchart of a method for forwarding a network frame and for learning SA and DA addresses. In step 100, a network frame is received including a source address and a destination address. The source and destination addresses are extracted from the network frame by the packet analysis and key extraction circuit 64 and passed to the binary search engine 66. The binary search engine searches the memory 58 (which contains the local lookup table) for the source address (step 102). If the source address is already in the lookup table of the port, then the port does not need to learn the source address. If, however, the source address is not in the table, then the port adds the source address to the table and forwards the learned address to the central management module 36. Next the search engine searches for the destination address (step 104). If the destination address is not in the lookup table for the port, the port "floods" the frame (i.e., sends it out on all ports). In step 106, the port requests the central management module 36 for information relating to the destination address. The central management module 36 searches the central lookup table 38 and passes the results, which includes information about the destination address, back to the port. The port then adds the destination address to its local lookup table (step 108). Now next time this same port receives the same destination address, it is already in the local lookup table. Consequently, the network frame can be forwarded more efficiently with future transmissions. Notably, other ports did not store information about the destination address in their memories because they may not receive network frames containing that destination address. Consequently, storing such information may be wasteful. Thus, each port stores DA addresses on an as needed basis. In other words, each port stores only DA addresses it actually uses. And with aging techniques, each port stores only DA addresses it used recently.

When learning SA and DA addresses the lookup table includes the SA/DA field 44 that indicates whether the entry is an SA or a DA address. This field is not required to implement the invention. For example, a port can determine whether an address is a DA or SA address by analyzing the forwarding information field 46. If the port number within field 46 is the same as the current port, then it is a SA, whereas if the port number differs, it is a DA.

Figure 6:
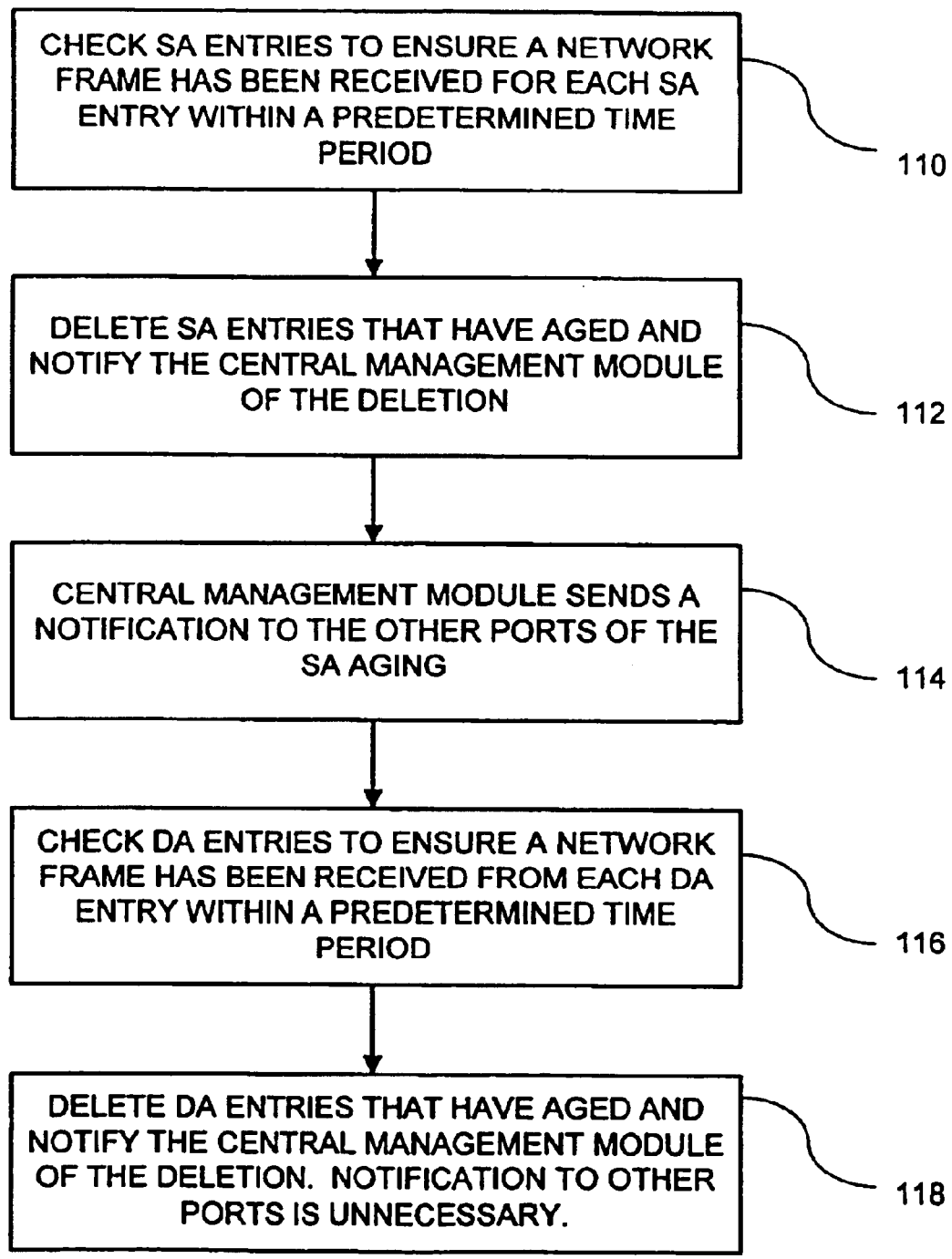
FIG. 6 is a flowchart for aging source and destination addresses within the lookup table.

FIG. 6 shows a flowchart of a method for aging both SA and DA table entries. In step 110, SA entries are checked by examining the aging field 48. If the aging field exceeds a predetermined limit, then the entry is stale and is deleted (step 112) and the central management module is notified. Otherwise, the aging field is incremented or decremented to indicate increased aging. The central management module then sends a message to all other ports that the SA entry is no longer valid (step 114). Ports that have the SA address (listed as a DA) delete it from their lookup tables. In step 116, the search engine also checks for DA aging by checking the aging field 48 of the DA entries as described above in relation to SA aging. If the DA entry is stale, it is deleted and the central management module is notified of the deletion (step 118). Unlike SA aging, the central management module need not notify other ports of the deletion, because a DA address that is stale on one port is not necessarily stale on another port.

Further details of the invention are provided below. In LAN/WAN bridging/switching/routing devices, usually look-up table(s) are used to store pertinent information for frames to be forwarded and modified. These routing devices usually consist of line cards, also termed interface cards, and a central management module. These routing devices generally have lookup or routing tables. This table(s) is maintained in a central location. The table is also called routing table and it consists of routing entries. The routing table entries consist of routing/forwarding information and these usually are indexed by addresses. These addresses may be MAC (Media Access Controller) addresses, IPv4 addresses, IPX addresses, IPv6 addresses or some other protocol addresses. The addresses can be either a source address (SA) or a destination address (DA). Entities needing the look-up results consult these table entries as and when needed for forwarding frames/packets from one port/interface card to another. The central table is usually maintained on the central management module.

The technique described herein uses distributed tables on line cards with a non-typical mechanism to update these tables, called distributed learning and an additional way to delete (age-out) entries from distributed tables called DA aging.

Further below describes a traditional way of maintaining central look-up table, adding (learning) new entries and deleting (aging) old entries:

A central management module stores a central table. In a typical scenario, the line cards (interfaces) are connected to end stations and the routing device performs routing of frames/packets from these end nodes. Line cards usually learn of new source addresses by observing frames sent by the end nodes connected to these line cards. As and when the line cards (LC) or interfaces learn of new source addresses. E.g. Media Access Controller (MAC) addresses, they send it to central management module to be learnt. Following sequence of events explain the traditional learning and routing mechanism:

LC-1 observes a frame/packet from source address A; sends it to central memory module to be learnt into the central table. Similarly, LC-2 observes a frame/packet from source address B; sends it to Central memory module to be learnt into the central table.

LC-3 observes a frame/packet from source address C; sends it to Central memory module to be learnt into the central table.

LC-4 observes a frame/packet from source address D; sends it to central memory module to be learnt into the central table.

LC-1 gets a frame destined to MAC address A. It asks Central memory module, where to send this frame?

Central memory module consults the central table and instructs LC-1 filter the frame, because it knows that the SA A was learnt from LC-1 and the end node resides under LC-1, hence the frame does not need routing/forwarding.

LC-1 gets a frame destined to MAC address B. It asks Central memory module, where to send this frame?

Central memory module consults the central table and instructs LC-1 to send that frame to LC-2, because that MAC address B was learnt on LC-2.

This process of learning and querying the central memory module continues. Line cards usually tell the central memory module, every time they see a frame from any SA. Central memory module will keep marking those entries as fresh. Central memory module will generally delete old entries in the central table, which have not been seen on any line card for a while. This process of aging the entries is called SA aging.

Distributed Learning Model with On-Demand Population

In a distributed forwarding/routing engine with on-demand population, a central table is maintained on the central memory module, but the line cards are instructed to keep a local copy of the pertinent part of the central table. Which part of the table should be kept on which line card is the essence of the technique described here.

In this method, line cards still do the SA learning as in the conventional forwarding model. Line cards still inform the central memory module about the SAs learnt by them. Line cards are required to keep a local copy of the SAs learnt by them. Central memory module helps line cards in learning any additional information they need to know, on strictly need to know basis. In this approach line cards get only those addresses for which they have any need. In effect only the pertinent portion of the central table on the Central memory module. For example:

LC-1 Learns A by observing a frame originated from MAC address A; It sends it to central memory module.

LC-2 learns B by observing a frame originated from MAC address B; It sends it to Central memory module LC-3 learns C by observing a frame originated from MAC address C; It sends it to Central memory module LC-4 learns D by observing a frame originated from MAC address D; It sends it to Central memory module LC-1 sees a frame to C; floods it (Sends it everywhere, because it does not know, for now, where to send frames destined to C.

LC-1 asks Central memory module to find destination for C.

Central memory module gives the table entry for C to LC-1, effectively telling the line card to forward all future frames destined for address C to line card 3. Line card 1 is required to keep that information local and use it in future.

LC-2 sees a frame to A; floods it.

LC-2 asks Central memory module to find destination for A . . . And so on.

Entries that are learnt on a line card, e.g. A on LC-1 are marked as source address (SA) entries. Entries learnt by a line card by querying the Central memory module are marked as DA entries. SA entries are typically aged periodically, when a line card sees no traffic from that MAC (as SA) for a period of time. When SA entries are aged from a line card, a message is sent to the Central memory module, so that it can in turn send messages to all line cards that are using that entry. Line card(s) upon reception of such message delete that entry from their local table. Entries marked as DAs on the line card tables are also periodically deleted (aged) as described later in this disclosure.

Following transactions like these, each line card will end up with a subset of the central table on the central memory module. After the first query to central memory module, each line card does the following look-ups on it's local table and if it finds the relevant entry, uses it to forward/route frame to correct destination.

This method of distributed learning has many advantages including an overall increased address table capacity by allowing the line cards to store only the useful/pertinent information.

The distributed nature of tables on each line card also allows for destination address (DA) based aging, by deleting entries associated with a DAs that have not been used for a while. DA aging is achieved by keeping an account of each entry's usage on each line card. When an entry is used on a line card as a DA entry, it is marked. The usage markers are periodically erased. When a line card finds an entry, which was a DA entry and has no marker set, it is deleted from that line card. This is done to remove the entries that were learnt from the central memory module. This additional step of aging DA type entries, in addition to aging SA type entries, enables each line card to remove the DA addresses for which there is no active conversation from that line card. This is needed for on-demand population method, because DAs are learned from the Central memory module, and they may sit idle on the line card table forever.

On-Demand Learning uses intelligence when learning network addresses and distributing them to interfaces on a switch. This is different than Global Learning, in which a switch indiscriminately teaches all learned addresses to all its interfaces. As the name suggests, On-Demand Learning distributes addresses only to those interfaces that require them. The best way to understand the benefits of this learning mechanism is to compare it to Global Learning, which is the scheme, used by most switches.

Global Learning—the Traditional Approach

When a switch employing Global Learning receives a packet from an address it hasn't learned, the switch floods the address to all interfaces, causing the address to be stored in the address table on each interface.

Global Learning does not use each module's address space efficiently. Consider a switch at the core of a network, where each of its ports can have thousands of devices downstream from it. Each device on the network could have MAC, IP, and IPX address information attached to it. The address tables on interface modules are quickly consumed by addresses they may never use.

For instance, on one vendor's switch, each interface module can hold 16,000 addresses and the management card likewise holds 16,000 addresses. As soon as the $16,001^{st}$ address comes across the switch, one of the entries is aged out to make room for the new entry and all the interfaces learn the new address-regardless of whether they need it or not. This process is repeated for every new entry.

On-Demand Learning—A Better Approach

On-Demand Learning takes a more elegant approach to learning addresses and distributing them to interface modules by doing so on an as-needed basis.

When a packet comes into the switch with an unknown SA, the source address is stored at the ingress port and sent to the management module. These first three steps of On-Demand Learning are depicted below.

This occurs every time a new address appears on the network, and the management module keeps a complete record of all of the addresses it has learned. However, unlike Global Learning, the management module does not flood the address information to all of the interface modules. Other interface modules' address tables are populated only with the addresses they require, when they require it.

When an interface needs to communicate with an unknown destination MAC address, it initially floods the packet inside of its broadcast domain/VLAN. Next, it asks the master address table if it knows its location. The master address table then populates the local address table with the address because it is now relevant to that interface. These final three steps are illustrated below.

Conclusion

Populating interface modules using On-Demand Learning allows switches and routers to support a larger number of devices than traditional global address learning techniques. With a table depth of 64K addresses per interface, On-Demand Learning allows the PowerRail 5200 Enterprise Routing Switch to support 1.5 million different routes/addresses per chassis. The interface modules are efficiently populated and are not burdened with addresses they may never use.

Having described and illustrated the principles of our invention with reference to preferred embodiments thereof, it will be apparent that these embodiments can be modified in arrangement and detail without departing from the principles of the invention.

For example, although the port 52 is shown as including separate components, such components can be formed in a single integrated circuit. Additionally, other circuit components, such as the port intercommunication logic 54 can also be included in the same integrated circuit as the port.

Additionally, any of the components of the switching device can be performed by hardware, software, or a combination thereof. The invention should not be limited to the particular technique (whether hardware or software) for carrying out the methods and apparatus described herein. For example, the search engine can be a microprocessor running software or an ASIC where the searches are performed in hardware.

Still further, although the lookup table is shown as containing table entries with multiple fields, the lookup table can be any type of data structure or array that stores data.

Yet further, the network packets can include any kind of data including video images, voice data during a phone call, a document, etc.

Still further, when a port receives a network frame, it can analyze the destination address (at layer two and layer three) and it can also analyze layer 4 policy information if desired.

Still yet further, the present invention may be applied to LAN's, WAN's, the Internet, Intranets, telephone networks, or any other network.

Additionally, although the lookup table is described as containing network addresses, the lookup table may include other keys. A key may include a network address exclusively or in combination with additional information. Alternatively, a key may include lookup information other than network addresses. Additionally, the switching device may receive network frames that include search keys. Alternatively, the search key may be derived from the network frame. For example, the search engine may use characteristics of the network frame, such as what port it was received on, to derive the search key. The search key, which is either explicitly included in the network frame or derived therefrom, is compared to the lookup table which includes lookup keys.

Additionally, although a binary search engine is used in the illustrated embodiment, other search engines can be used instead, including linear search engines, CAM, binary radix trees, hashing, etc.

In view of the many possible embodiments to which the principles or invention may be applied, it should be recognized that the illustrated embodiment is only a preferred example of the invention and should not be taken as a limitation on the scope of the invention. Rather, the invention is defined by the following claims. We therefore claim as the invention all such embodiments that come within the scope of these claims.

We claim:

1. A method for forwarding network frames on a network forwarding device, comprising the steps of:

receiving, on a first port, a network address including a source address and a destination address;

searching a lookup table within the first port for the destination address;

if the destination address is not found in the lookup table, learning the destination address by inserting an entry in the lookup table for the destination address; and wherein other ports on the network forwarding device do not learn the destination address because of receipt on the first port.

2. A network switching device comprising:

a central management module scoring a central lookup table including one or more entries;

a first switching interface coupled to the central management module, the first switching interface storing a first portion of the entries in a first local table; and a second switching interface coupled to the central management module, the second switching interface storing a second portion of the entries in a second local table, characterized in that the central management module receives from the first switching interface a request for information associated with one of the entries in the central lookup table and the central management module transmits the information to only the first switching interface for storing only in the first local table as a part of a new entry.

3. The network switching device of claim 2, wherein the first and second switching interfaces are first and second ports an the network switching device.

4. The network switching device of claim 2 further characterized in that the central management module foregoes transmittal of the information to the second switching interface.

5. The network switching device of claim 2, wherein the first and second local tables store active entries used by the first and second switching interfaces during a predetermined time period.

6. The network switching device of claim 2, wherein an entry in the first or second local table is removed if not used within a predetermined time period.

7. The network switching device of claim 6, wherein the entry is removed from all local tables.

8. The network switching device of claim 6, wherein the entry is removed from a single local table.

9. A method for forwarding data packets via a network switching device having a plurality of switching interfaces, each switching interface storing a local lookup table, the method comprising:

receiving at a switching interface a data packet including a destination address;

searching a local lookup table associated with the switching interface for the destination address;

transmitting by the switching interface a request for information associated with the destination address if the search is unsuccessful;

transmitting the information to the requesting switching interface for storing in the associated local lookup table; and foregoing transmittal of the information to non-requesting switching interfaces.

10. The method of claim 9, wherein the switching interface is a port on the network switching device.

11. The method of claim 9, wherein the local lookup table stores active entries used by the switching interface during a predetermined time period.

12. The method of claim 9 further comprising removing an entry in the local lockup table if the entry is not used within a predetermined time period.

13. The method of claim 12, wherein the entry is removed from all local lookup tables.

* * * * *